US010095952B2

(12) United States Patent
Zhao

(10) Patent No.: US 10,095,952 B2
(45) Date of Patent: Oct. 9, 2018

(54) METHOD AND DEVICE FOR ACQUIRING CLOTHING IMAGE ATTRIBUTE POINTS

(71) Applicants: BEIJING JINGDONG SHANGKE INFORMATION TECHNOLOGY CO., LTD., Haidian District, Beijing (CN); BEIJING JINGDONG CENTURY TRADING CO., LTD., Beijing (CN)

(72) Inventor: Gang Zhao, Beijing (CN)

(73) Assignees: BEIJING JINGDONG SHANGKE INFORMATION TECHNOLOGY CO., LTD., Haidian District, Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 52 days.

(21) Appl. No.: 15/318,125

(22) PCT Filed: Jun. 11, 2015

(86) PCT No.: PCT/CN2015/081261
§ 371 (c)(1),
(2) Date: Dec. 12, 2016

(87) PCT Pub. No.: WO2015/188767
PCT Pub. Date: Dec. 17, 2015

(65) Prior Publication Data
US 2017/0124420 A1 May 4, 2017

(30) Foreign Application Priority Data
Jun. 13, 2014 (CN) .......................... 2014 1 0264313

(51) Int. Cl.
*G06K 9/00* (2006.01)
*G06K 9/50* (2006.01)
(Continued)

(52) U.S. Cl.
CPC .......... *G06K 9/4638* (2013.01); *G06K 9/4604* (2013.01); *G06K 9/48* (2013.01); *G06Q 30/06* (2013.01); *G06Q 30/0643* (2013.01)

(58) Field of Classification Search
USPC .................................................. 382/201, 111
See application file for complete search history.

(56) References Cited

U.S. PATENT DOCUMENTS

2007/0000007 A1 1/2007 MacDonald et al.
2017/0011452 A1* 1/2017 Beckham ........... G06Q 30/0643
2017/0084035 A1* 3/2017 Han ........................ G06T 3/403

FOREIGN PATENT DOCUMENTS

CN 101493930 7/2009
CN 102682211 9/2012
(Continued)

OTHER PUBLICATIONS

International Search Report and Written Opinion with English Translation for Application No. PCT/CN2015/081261 dated Aug. 28, 2015 (10 pages).

*Primary Examiner* — Kathleen Y Dulaney
(74) *Attorney, Agent, or Firm* — Michael Best & Friedrich LLP

(57) ABSTRACT

The invention provides a method and device for acquiring clothing image attribute points, which can increase an efficiency of acquiring the clothing image attribute points. The method comprises: saving five attribute points manually calibrated and determining first to eleventh points in sequence by taking a horizontal direction as a horizontal coordinate and a vertical direction as a vertical coordinate, for a first side of two bilaterally symmetric sides of the clothing image. By means of a technical solution of an embodiment of the present invention, for the clothing image, five points are manually calibrated first; and then the other eleven attribute points can be determined by a computer, so (Continued)

that a manual workload is reduced, and the efficiency of acquiring the clothing image attribute points is increased.

8 Claims, 2 Drawing Sheets

(51) Int. Cl.
*G06K 9/46* (2006.01)
*G06Q 30/06* (2012.01)
*G06K 9/48* (2006.01)

(56) References Cited

FOREIGN PATENT DOCUMENTS

CN 103578004 2/2014
CN 104008501 8/2014

\* cited by examiner

METHOD AND DEVICE FOR ACQUIRING CLOTHING IMAGE ATTRIBUTE POINTS

CROSS-REFERENCE TO RELATED APPLICATIONS

This application is a national stage filing under 35 U.S.C. 371 of International Application No. PCT/CN2015/081261 filed Jun. 11, 2015, which claims the foreign priority benefits of Chinese Patent Application No. 201410264313.8 filed Jun. 13, 2014, which are incorporated by reference herein in their entireties.

TECHNICAL FIELD

The invention relates to the field of computer technology, and in particular to a method and device for acquiring clothing image attribute points.

BACKGROUND ART

Along with development of e-commerce, online shopping becomes a consumption pattern for more and more people. Purchase of clothes is one of main consumption directions for the people. Since the clothes are generally required to be tried on, a virtual fitting technique emerges as the times require. Virtual fitting refers to using computer technology to let a virtual model try on the clothes sold on line instead of an actual user, and a certain reference is given to the user to selectively purchase the clothes on line by means of an effect presented by the fitting of the virtual model, which facilitates the purchase of proper clothes by the user. In the virtual fitting, a piece of clothing used is required to be processed, and in addition to performing image processing to a clothing image, it is further required to acquire some attribute points on the clothing image, the attribute points correspond to points on the virtual fitting model, so that a virtual fitting software can accurately make the virtual fitting model "put on" the piece of clothing.

At present, a manner of acquiring clothing image attribute points mainly depends on manpower, i.e., a person clicks a position to be calibrated on the clothing image to form an attribute point at this position. The clothing image is generally a front view of the piece of clothing, and at this time, the clothing image is bilaterally symmetric. There are generally more than ten attribute points of the clothing image, and a manner of manual calibration is comparatively time-consuming and comparatively low in efficiency.

SUMMARY OF THE INVENTION

In view of this, the invention provides a method and device for acquiring clothing image attribute points, which can increase an efficiency of acquiring the clothing image attribute points.

In order to achieve the above object, according to one aspect of the invention, a method for acquiring clothing image attribute points is provided.

The method for acquiring clothing image attribute points of the invention comprises: saving five attribute points manually calibrated, i.e., shoulder angle points at two sides, i.e., a left side and a right side, a midpoint of a lower hem, and midpoints of sleeve edges of two sleeves, i.e., a left sleeve and a right sleeve, for a front presented clothing image; determining first to eleventh points below in sequence by taking a horizontal direction as a horizontal coordinate and a vertical direction as a vertical coordinate, for a first side of two bilaterally symmetric sides of the clothing image: a first point being an upper end point at the first side; a second point being located on a shoulder edge at the first side, and having its horizontal coordinate being a midpoint of the first point and the shoulder angle point at the first side; a third point being an outside point of the sleeve edge at the first side; a fourth point being an inside point of the sleeve edge at the first side; a fifth point and a sixth point being respectively located on an outside edge in the sleeve and an inside edge in the sleeve at the first side, a connecting line of the two points being perpendicular to a connecting line of the shoulder angle point at the first side and the third point, a vertical coordinate of a perpendicular foot being located at a preset position between the shoulder angle pint at the first side and the third point; a seventh point being an angle point of the lower hem at the first side; and eighth to eleventh points being located on a connecting line from a midpoint of the second point and the shoulder angle point at the first side to the seventh point, and being distributed at preset positions; and determining points symmetric with the first to eleventh points at a second side of the two bilaterally symmetric sides of the clothing image.

Optionally, a proportion of a distance from the perpendicular foot to the third point to a distance from the third point to the shoulder angle point at the first side is 0.35-0.45:1.

Optionally, a proportion of a distance from the eighth point to the second point to a distance from the second point to the seventh point is 0.18-0.22:1; a proportion of a distance from the ninth point to the second point to a distance from the second point to the seventh point is 0.28-0.32:1; a proportion of a distance from the tenth point to the second point to a distance from the second point to the seventh point is 0.58-0.62:1; and a proportion of a distance from the eleventh point to the second point to a distance from the second point to the seventh point is 0.88-0.92:1.

According to the other aspect of the invention, a device for acquiring clothing image attribute points is provided.

The device for acquiring clothing image attribute points in the invention comprises: a basic point module for saving five attribute points manually calibrated, i.e., shoulder angle points at two sides, i.e., a left side and a right side, a midpoint of a lower hem, and midpoints of sleeve edges of two sleeves, i.e., a left sleeve and a right sleeve, for a front presented clothing image; and a determination module for determining first to eleventh points below in sequence by taking a horizontal direction as a horizontal coordinate and a vertical direction as a vertical coordinate, for a first side of two bilaterally symmetric sides of the clothing image: a first point being an upper end point at the first side; a second point being located on a shoulder edge at the first side, and having its horizontal coordinate being a midpoint of the first point and the shoulder angle point at the first side; a third point being an outside point of the sleeve edge at the first side; a fourth point being an inside point of the sleeve edge at the first side; a fifth point and a sixth point being respectively located on an outside edge in the sleeve and an inside edge in the sleeve at the first side, a connecting line of the two points being perpendicular to a connecting line of the shoulder angle point at the first side and the third point, a vertical coordinate of a perpendicular foot being located at a preset position between the shoulder angle pint at the first side and the third point; a seventh point being an angle point of the lower hem at the first side; and eighth to eleventh points being located on a connecting line from a midpoint of the second point and the shoulder angle point at the first side to the seventh point, and being distributed at preset positions; and determining points symmetric with the first to eleventh points at a second side of the two bilaterally symmetric sides of the clothing image.

Optionally, a proportion of a distance from the perpendicular foot to the third point to a distance from the third point to the shoulder angle point at the first side is 0.35-0.45:1.

Optionally, a proportion of a distance from the eighth point to the second point to a distance from the second point to the seventh point is 0.18-0.22:1; a proportion of a distance from the ninth point to the second point to a distance from the second point to the seventh point is 0.28-0.32:1; a proportion of a distance from the tenth point to the second point to a distance from the second point to the seventh point is 0.58-0.62:1; and a proportion of a distance from the eleventh point to the second point to a distance from the second point to the seventh point is 0.88-0.92:1.

According to the technical solution of the invention, for the clothing image, five points are manually calibrated first, and then the other eleven attribute points can be determined by a computer, so that a manual workload is reduced, and the efficiency of acquiring the clothing image attribute points is increased.

BRIEF DESCRIPTION OF THE DRAWINGS

Figures are used for better understanding the invention, and do not form improper limitations of the invention. Wherein.

DETAILED DESCRIPTION

The contents below give descriptions of exemplary embodiments of the invention by taking the figures into consideration, and the contents include various details of the embodiments of the invention to facilitate understanding, and shall be considered as exemplary ones only. Thus, those skilled in the art should realize that the embodiments described herein can be changed and modified in various manners without departing from the scope and spirit of the invention. Similarly, for clarity and conciseness, descriptions of common functions and structures are omitted in the descriptions below.

Figure 1:
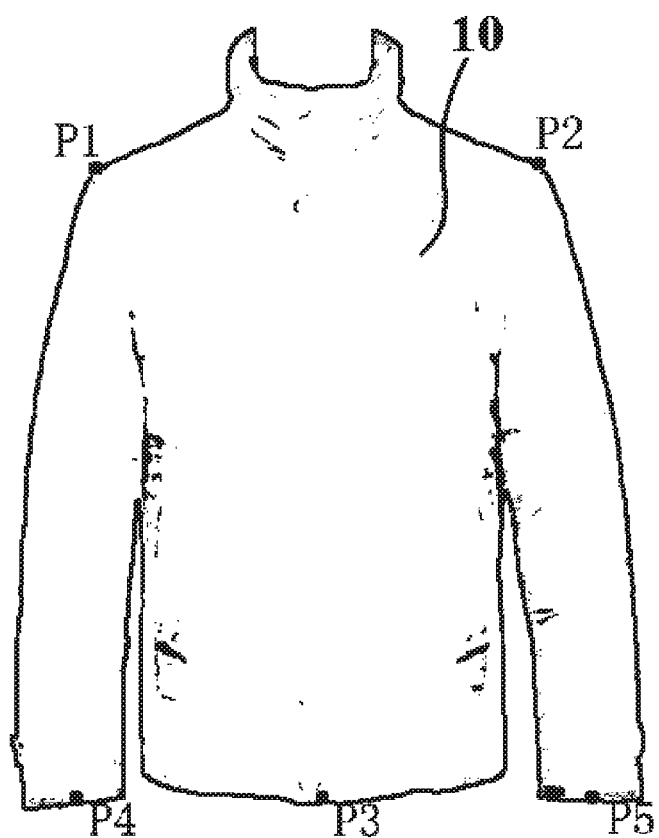
FIG. 1 is a schematic diagram of five points manually calibrated on a clothing image according to an embodiment of the invention.

In the embodiment of the invention, five points are manually calibrated first, and then the other attribute points are determined by a computer in accordance with these five points. Since the number of points manually calibrated is reduced, an efficiency of acquiring clothing image attribute points is increased. The five points manually calibrated are as shown in FIG. 1. FIG. 1 is a schematic diagram of five points manually calibrated on a clothing image according to an embodiment of the invention. As shown in FIG. 1, five points P1 to P5 are calibrated on a clothing image 10, and are located at respectively shoulder angle points at two sides, i.e., a left side and a right side, a midpoint of a lower hem, and midpoints of sleeve edges of two sleeves, i.e., a left sleeve and a right sleeve. For clear illustration, FIG. 1 mainly shows a contour of a piece of clothing.

Figure 2:
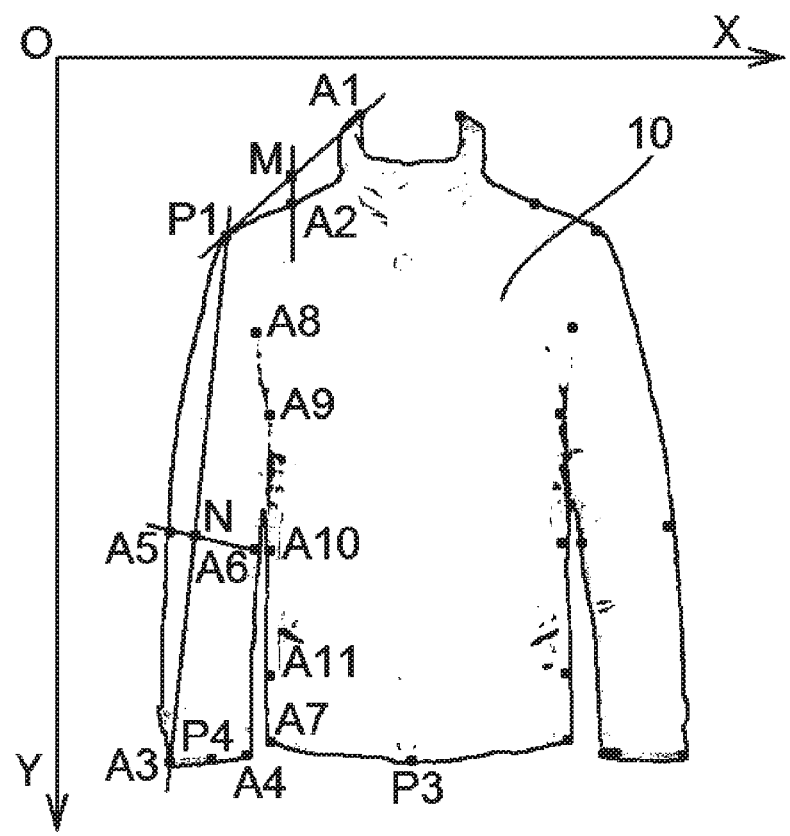
FIG. 2 is a schematic diagram of clothing image attribute points automatically acquired according to the embodiment of the invention.

The contents below describe a manner of acquiring other points after calibrating the points P1 to P5. It can be obtained automatically in this manner by using a computer. FIG. 2, which is a schematic diagram of clothing image attribute points automatically acquired according to the embodiment of the invention, is referred to. In this embodiment, points A1 to A11 in FIG. 2 are determined in sequence, and these points are located at a left side of the clothing image 10 that is bilaterally symmetric, and then points symmetric with the points A1 to A11 at a right side of the clothing image can be determined in accordance with the bilateral symmetry of the clothing image.

A coordinate system as shown in the figure can be established, an X-axis extends rightwards in a horizontal direction, and a Y-axis extends downwards in a vertical direction. A point A1 is determined first. The clothing image can be scanned pixel by pixel (hereinafter, if there is no special explanation, "scans" all refer to ones pixel by pixel) in the direction of the Y-axis, i.e., from top to bottom, from the X-axis, and when a first nontransparent point is scanned at a left side of a vertical symmetric axis (not shown in the figure) of the clothing image 10, this point is determined as the point A1.

Next, a point A2 is determined. The point A2 is located at a shoulder edge, and its horizontal coordinate is a midpoint of the point A1 and the point P1. The respective points of the edge of the shoulder can be scanned from top to bottom, meanwhile the horizontal coordinates of the scanned points are detected, and when the horizontal coordinate is equal to an average value of the horizontal coordinate of the point A1 and the horizontal coordinate of the point P1, the scanned point is determined as the point A2. Or a point M can be directly taken on a connecting line of the point A1 and the point P1 as shown in FIG. 2, the horizontal coordinate of the point M is equal to the average value of the horizontal coordinate of the point A1 and the horizontal coordinate of the point P1, then a vertical line is made to pass by the point M, and an intersection point of this vertical line and the shoulder edge is just the point A2. Thus, an edge detecting step can be omitted.

Next, points A3 and A4 are determined. The points A3 and A4 are respectively an outside point and an inside point of the sleeve edge. The sleeve edge is a horizontal or slightly slanted line presented by a cuff edge on the image. The scan can be made towards both sides respectively along the sleeve edge from the point P4, and two end points of the sleeve edge that are scanned are just respectively the points A3 and A4. Or the scan pixel by pixel can be made towards the left in the horizontal direction from the point P4, after one pixel is scanned, the scan is made upwards and downwards respectively in the vertical direction from this pixel, when the two adjacent scans in the same direction respectively obtain a transparent point and a nontransparent point, it indicates that this nontransparent pint is the cuff edge, and the scan pixel by pixel is continued to be made in the horizontal direction from this nontransparent point, i.e., the above process is repeated to obtain the outside point A3 of the sleeve edge. In the above manner, the inside point A4 of the sleeve edge is obtained by scanning pixel by pixel towards the right in the horizontal direction from the point A4. In the descriptions of this embodiment, the outside refers to a side away from the vertical symmetric axis of the piece of clothing.

After the point A3 is determined, points A5 and A6 can be determined. At this time, the point P1 and the point A3 can be connected first, a point N is taken on the connecting line, a distance between the point N and the point A3 is substantially 0.35 to 0.45 time of a distance between the point P1 and the point A3, a vertical line of this connecting line is made to pass by the point N, and two intersection points with the edge of the sleeve are just the points A5 and A6. The scan can be made towards the outside and the inside of the sleeve respectively along this vertical ling from the point N, and when the transparent points are scanned, the nontransparent points scanned for the last time are just the points A5 and A6.

Next, a point A7 is determined. The scan is made towards the left, i.e., towards the outside, from the point P3, and the manner is similar to that in which the point A3 is determined.

After the point A7 is determined, points A8 to A11 can be determined. A midpoint N of the point P1 and the point A2 is taken first, then the point N and the point A7 are connected, and the points A8 to A11 are just distributed on the connecting ling. A parameter T is taken to represent a proportion of a distance from a point on this connecting line to the point N to a distance from the point N to the point A7, and then the points A8 to A11 are respectively located at positions with the proportions of 0.2, 0.3, 0.6 and 0.8. The above proportions each allow a minor change.

After the above points A1 to A11 are determined, symmetric points at the other side of the clothing image can be obtained in accordance with the bilateral symmetry of the clothing image. In a process of achieving virtual fitting, the points A1 to A11 and the point P1, plus the symmetric points of these points at the right side of the clothing image can basically determine substantially all shapes of the clothing image, and for an image of a piece of clothing with a complicated design, attribute points can be further manually added by manpower.

Figure 3:
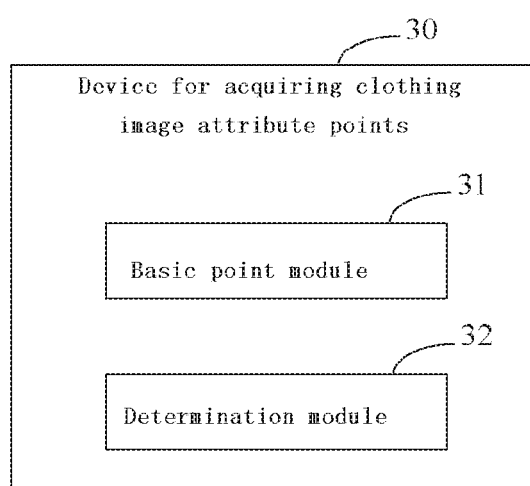
FIG. 3 is a schematic diagram of a basic structure of a device for acquiring clothing image attribute points according to the embodiment of the invention.

FIG. 3 is a schematic diagram of a basic structure of a device for acquiring clothing image attribute points according to the embodiment of the invention. This device can be arranged in a computer as software. As shown in FIG. 3, a device 30 for acquiring clothing image attribute points of the embodiment of the invention mainly comprises a basic point module 31 and a determination module 32. The basic point module 31 is used for saving five attribute points manually calibrated, i.e., shoulder angle points at two sides, i.e., a left side and a right side, a midpoint of a lower hem, and midpoints of sleeve edges of two sleeves, i.e., a left sleeve and a right sleeve, for a front presented clothing image. The determination module 32 is used for determining the points A1 to A11 in sequence in the manners as described above by taking a horizontal direction as a horizontal coordinate and a vertical direction as a vertical coordinate, for a first side of two bilaterally symmetric sides of the clothing image.

According to the technical solution of the invention, for the clothing image, five points are manually calibrated first, and then the other eleven attribute points can be determined by a computer, so that a manual workload is reduced, and the efficiency of acquiring the clothing image attribute points is increased.

The contents above describe the basic principle of the invention by taking the embodiments into consideration, but it should be noted that those skilled in the art can understand that all of or any of steps or components of the method and device of the invention can be achieved by hardware, firmware, software or a combination thereof in any computing apparatus (including a processor, a storage medium, etc.) or a network of a computing apparatus. This can be achieved by those skilled in the art just by using their basic programming skills in the case of reading the descriptions of the invention.

Thus, the object of the invention can be further achieved by running a program or a set of programs on any computing apparatus. The computing apparatus can be a common universal apparatus. Thus, the object of the invention can be also achieved only by providing a program product containing a program code for achieving the method or device. That is to say, such program product also forms the invention, and a storage medium storing such program product also forms the invention. Obviously, the storage medium can be any common storage medium or any storage medium to be developed in the future.

It should be further noted that in the device and method of the invention, it is obvious that the respective components or respective steps can be separated and/or recombined. These separations and/or re-combinations shall be deemed as equivalent solutions of the invention. Furthermore, the steps for performing the above-mentioned series of processes can be naturally chronologically performed in the described order, but are not necessarily chronologically performed. Some steps can be performed in parallel or independently of each other.

The above embodiments do not form limitations of the scope of protection of the invention. Those skilled in the art should understand that depending on requirements for design and other factors, various modifications, combinations, sub-combinations and substitutions can occur. Any modification, equivalent substitution, improvement and the like made within the spirit and principle of the invention shall be contained in the scope of protection of the invention.

The invention claimed is:

1. A method for acquiring clothing image attribute points, characterized by comprising:
saving five attribute points manually calibrated, including, a shoulder angle point at a left side and a shoulder angle point at a right side, a midpoint of a lower hem, a midpoint of a sleeve edge of a left sleeve, and a midpoint of sleeve edge of a right sleeve, for a front presented clothing image;
determining first to eleventh points below in sequence by taking a horizontal direction as a horizontal coordinate and a vertical direction as a vertical coordinate, for a first side of two bilaterally symmetric sides of the clothing image:
a first point being an upper end point at the first side;
a second point being located on a shoulder edge at the first side, a horizontal coordinate of the second point being a midpoint of the first point and the shoulder angle point at the first side;
a third point being an outside point of the sleeve edge at the first side;
a fourth point being an inside point of the sleeve edge at the first side;
a fifth point and a sixth point being respectively located on an outside edge in a sleeve at the first side and an inside edge in the sleeve at the first side, a connecting line of the fifth point and the sixth point being perpendicular to a connecting line of the shoulder angle point at the first side and the third point, a vertical coordinate of a perpendicular foot being located at a preset position between the shoulder angle point at the first side and the third point;
a seventh point being an angle point of the lower hem at the first side; and
eighth to eleventh points being located on a connecting line from a midpoint of the second point and the shoulder angle point at the first side to the seventh point, and being distributed at preset positions; and determining points symmetric with the first to eleventh points at a second side of the two bilaterally symmetric sides of the clothing image.

2. The method according to claim 1, characterized in that a proportion of a distance from the perpendicular foot to the third point to a distance from the third point to the shoulder angle point at the first side is 0.35-0.45:1.

3. The method according to claim 1, characterized in that a proportion of a distance from the eighth point to the second point to a distance from the second point to the seventh point is 0.18-0.22:1;
a proportion of a distance from the ninth point to the second point to a distance from the second point to the seventh point is 0.28-0.32:1;
a proportion of a distance from the tenth point to the second point to a distance from the second point to the seventh point is 0.58-0.62:1; and
a proportion of a distance from the eleventh point to the second point to a distance from the second point to the seventh point is 0.88-0.92:1.

4. The method according to claim 2, characterized in that a proportion of a distance from the eighth point to the second point to a distance from the second point to the seventh point is 0.18-0.22:1;
a proportion of a distance from the ninth point to the second point to a distance from the second point to the seventh point is 0.28-0.32:1;
a proportion of a distance from the tenth point to the second point to a distance from the second point to the seventh point is 0.58-0.62:1; and
a proportion of a distance from the eleventh point to the second point to a distance from the second point to the seventh point is 0.88-0.92:1.

5. A device for acquiring clothing image attribute points, characterized by comprising:
a processor configured to
save five attribute points manually calibrated, including, shoulder angle point at a left side and a shoulder angle point at right side, a midpoint of a lower hem, a midpoint of sleeve edges of a left sleeve and a midpoint of sleeve edges of a right sleeve, for a front presented clothing image; and
determine first to eleventh points below in sequence by taking a horizontal direction as a horizontal coordinate and a vertical direction as a vertical coordinate, for a first side of two bilaterally symmetric sides of the clothing image:
a first point being an upper end point at the first side;
a second point being located on a shoulder edge at the first side, a horizontal coordinate of the second point being a midpoint of the first point and the shoulder angle point at the first side;
a third point being an outside point of the sleeve edge at the first side;
a fourth point being an inside point of the sleeve edge at the first side;
a fifth point and a sixth point being respectively located on an outside edge in a sleeve at the first side and an inside edge in the sleeve at the first side, a connecting line of the fifth point and the sixth point being perpendicular to a connecting line of the shoulder angle point at the first side and the third point, a vertical coordinate of a perpendicular foot being located at a preset position between the shoulder angle point at the first side and the third point;
a seventh point being an angle point of the lower hem at the first side; and
eighth to eleventh points being located on a connecting line from a midpoint of the second point and the shoulder angle point at the first side to the seventh point, and being distributed at preset positions; and
determining points symmetric with the first to eleventh points at a second side of the two bilaterally symmetric sides of the clothing image.

6. The device according to claim 5, characterized in that a proportion of a distance from the perpendicular foot to the third point to a distance from the third point to the shoulder angle point at the first side is 0.35-0.45:1.

7. The device according to claim 5, characterized in that a proportion of a distance from the eighth point to the second point to a distance from the second point to the seventh point is 0.18-0.22:1;
a proportion of a distance from the ninth point to the second point to a distance from the second point to the seventh point is 0.28-0.32:1;
a proportion of a distance from the tenth point to the second point to a distance from the second point to the seventh point is 0.58-0.62:1; and
a proportion of a distance from the eleventh point to the second point to a distance from the second point to the seventh point is 0.88-0.92:1.

8. The device according to claim 6, characterized in that a proportion of a distance from the eighth point to the second point to a distance from the second point to the seventh point is 0.18-0.22:1;
a proportion of a distance from the ninth point to the second point to a distance from the second point to the seventh point is 0.28-0.32:1;
a proportion of a distance from the tenth point to the second point to a distance from the second point to the seventh point is 0.58-0.62:1; and
a proportion of a distance from the eleventh point to the second point to a distance from the second point to the seventh point is 0.88-0.92:1.

* * * * *